United States Patent
Neumann et al.

(10) Patent No.: US 12,462,000 B2
(45) Date of Patent: Nov. 4, 2025

(54) EXTENDABLE VEHICLE ELECTRONICS SYSTEM, EXTENSION MODULE, AND ASSOCIATED METHODS

(71) Applicant: Aptiv Technologies AG, Schaffhausen (CH)

(72) Inventors: Markus Neumann, Nuremberg (DE); Tim Welsch, Neustadt (DE)

(73) Assignee: Aptiv Technologies AG, Schaffhausen (CH)

(*) Notice: Subject to any disclaimer, the term of this patent is extended or adjusted under 35 U.S.C. 154(b) by 238 days.

(21) Appl. No.: 18/164,176

(22) Filed: Feb. 3, 2023

(65) Prior Publication Data
US 2023/0267182 A1 Aug. 24, 2023

(30) Foreign Application Priority Data
Feb. 24, 2022 (GB) ..................... 2202538

(51) Int. Cl.
*G06F 21/12* (2013.01)
*G06F 21/53* (2013.01)
*H04B 1/3827* (2015.01)

(52) U.S. Cl.
CPC ............ *G06F 21/123* (2013.01); *G06F 21/53* (2013.01); *H04B 1/3827* (2013.01)

(58) Field of Classification Search
USPC ........................................... 713/193
See application file for complete search history.

(56) References Cited

U.S. PATENT DOCUMENTS

| 11,368,192 | B2* | 6/2022 | Hong | H04W 12/06 |
| 11,435,580 | B1* | 9/2022 | Sneitzer | B64D 43/00 |
| 2010/0128890 | A1 | 5/2010 | Boulia | |
| 2014/0310788 | A1 | 10/2014 | Ricci | |

(Continued)

FOREIGN PATENT DOCUMENTS

| CA | 2605317 C | * 12/2015 | |
| CA | 3026891 A1 | * 12/2017 | G07C 9/38 |

(Continued)

OTHER PUBLICATIONS

"Combined Search and Examination Report", GB Application No. 2202538.1, Jul. 15, 2022, 5 pages.

(Continued)

*Primary Examiner* — Sakinah White Taylor
(74) *Attorney, Agent, or Firm* — Harness, Dickey & Pierce, P.L.C.

(57) ABSTRACT

Extendable vehicle electronics system including a base unit having base electronic components for implementing base electronic functions. An extension module includes a module data transceiver and extension electronic components operable in combination with the base electronic components for implementing extended electronic functions. A base data transceiver is used for communications between the base unit and the module data transceiver. A module locator locates the extension module for communication between the base unit and the module data transceiver. The extension electronic components include a processor for processing input data to generate output data within the extension module for transmission to the base unit.

18 Claims, 3 Drawing Sheets

(56) References Cited

U.S. PATENT DOCUMENTS

| | | |
|---|---|---|
| 2015/0100633 A1 | 4/2015 | Barrett et al. |
| 2016/0197783 A1 | 7/2016 | Hort et al. |
| 2017/0072794 A1 | 3/2017 | Buttolo et al. |
| 2017/0201584 A1* | 7/2017 | Endo ................ B60R 16/023 |
| 2017/0244456 A1* | 8/2017 | Kim .................... H04B 7/0602 |
| 2017/0354048 A1 | 12/2017 | Harshbarger et al. |
| 2022/0344934 A1* | 10/2022 | Jayan ..................... H02J 3/004 |

FOREIGN PATENT DOCUMENTS

| | | | | |
|---|---|---|---|---|
| CA | 3026953 A1 * | 12/2017 | ............... | B66F 9/24 |
| CN | 106059049 B * | 5/2019 | ............... | H02J 9/02 |
| TW | 202210920 A * | 3/2022 | | |
| WO | WO-2020050315 A1 * | 3/2020 | ............ | B60R 16/02 |

OTHER PUBLICATIONS

"Combined Search and Examination Report", GB Application No. 2201323.9, Jul. 18, 2022, 5 pages.

"European Search Report", EP Application No. 23153860, Jul. 6, 2023, 7 pages.

* cited by examiner

EXTENDABLE VEHICLE ELECTRONICS SYSTEM, EXTENSION MODULE, AND ASSOCIATED METHODS

CROSS-REFERENCE TO RELATED APPLICATION

This application claims priority to United Kingdom Patent Application Number 2202538.1, filed Feb. 24, 2022, the disclosure of which is hereby incorporated by reference in its entirety herein.

BACKGROUND

The present disclosure relates to an extendable vehicle electronics system, an extension module for use in the same, and methods of implementing extended electronic functions in a vehicle electronics system. The present disclosure is particularly relevant to extendable automotive infotainment systems and cockpit computing systems and other such vehicle multimedia units that allow for plug and play modules to provide upgraded or additional functionality.

Vehicle multimedia units (MUs) have become an increasingly important part of modern vehicles for implementing user experience (UX) applications for both drivers and passengers. However, the innovation cycles for such UX applications are significantly faster than a typical vehicle lifetime. As such, new UX applications will often require ever greater hardware capabilities and performance, such as processing power, memory and peripherals, which were not available or considered necessary at the time the MU and vehicle was designed or manufactured. This means that a vehicle can become out of date in the market prematurely purely because its MU lacks the hardware capabilities to run the latest MU software.

Typically, it is not practical to upgrade a modern vehicle's MU entirely, because of the complexity of its integration into the vehicle, both in terms of the MUs communications with other electronic control units (ECUs) in the vehicle and the hardwired physical connections used to establish those communications. Furthermore, adding new hardware to an existing MU system is also often not possible because of incompatibilities between upgraded functions and the pre-existing software and hardware capabilities. For example, when new higher resolution camera sensors become available, it is often not possible to integrate these because the communication protocols and data formats and computing capabilities used by the existing base components cannot handle the higher rates associated with the new sensor.

The above is also becoming important in the context of how modern vehicles are being used, and in particular in the context of an increasing prevalence of car-sharing models. In such scenarios, different users of a vehicle may require or be permitted to access different functionality. For instance, licensing or privacy restrictions may mean that certain services should be limited to specific authorized user groups. As such, it would be useful to allow basic functionality to be extended selectively for specific users.

Accordingly, there remains a need to address the above shortcomings in MUs and UX systems.

SUMMARY

According to a first aspect, there is provided an extendable vehicle electronics system including: a base unit including a plurality of base electronic components for implementing base electronic functions; an extension module including a module data transceiver and extension electronic components operable in combination with the base electronic components for implementing extended electronic functions; a base data transceiver for communication between the base unit and the module data transceiver; and a module locator for locating the extension module for communication between the base unit and the module data transceiver; wherein the extension electronic components include a processor for processing input data to generate output data within the extension module for transmission to the base unit.

In this way, the functionality of an electronics system within a vehicle may be extended without needing to replace the base unit. Accordingly, additional hardware in the form of sensor components or other functional blocks may be communicatively connected to operate in conjunction with the base unit to extend the functionality of the system. Moreover, this can be achieved by simply locating the module on the module locator, such as a receptacle, platform or docking location. Advantageously, the processing module allows pre-processing of, for instance, additional sensor data to be carried out within the extension module itself, thereby facilitating integration of the extended functionality into the base unit's existing systems. In automotive electronics systems, this may be especially advantageous because multimedia units can be upgraded to provide new functionality during the vehicle's lifespan. This reduces costs, and allows upgraded services and an up to date user experience to be continually provided.

In embodiments, the extension module further includes one or more functional blocks. In this way, additional functional blocks, such as sensor or actuators for implementing extended electronic functions, may be provided. In embodiments, the one or more functional blocks include one or more sensors for generating the input data. In this way, an additional input, or a combination of inputs may be utilized to enhance an existing service or enable a new service within the vehicle infrastructure.

In embodiments, the one or more sensors include one of: a camera, a time of flight (TOF) camera, an accelerometer, an alcohol sensor, an air condition sensor, a gas sensor, a temperature sensor, a passenger radar sensor, a fingerprint sensor, a cellular modem, a wireless modem, a microphone array, an RFID sensor, a WLAN or Bluetooth device, a proximity locator, a ultra-wideband device with localization sensor capabilities, and the like.

In embodiments, the processor is configured to generate the output data in a communication protocol for transmission to the base unit. In this way, new sensors or functional blocks within the extension module may be mounted to the base unit for integration into the existing UX system.

In embodiments, the processor is configured to process the input data to generate output data in a data format native to the base electronic components. In this way, data from new sensors or functional blocks within the extension module may be converted into a format suitable for integration into the existing UX system, thereby allowing more modern peripherals to be used in conjunction with the existing components. In embodiments, the processor may generate the input data by first performing format conversion and then performing pre-processing.

In embodiments, the processor is configured to process the input data to generate output data as a service output. In this way, the extension module may function to provide a self-contained service in which input data is processed internally to determine an output response. Advantageously, the base unit does not need to be aware of the processing done within the extension module, as only the output responses need to be processed by the base unit. This thereby provides flexibility to integrate new functionality which is not otherwise accommodated by the UX system. For example, alcohol sensor or biometric data may be analyzed in the extension module to determine whether to generate a vehicle start instruction. Where an instruction is issued, the base unit may then authorize the starting of the vehicle's engine.

In embodiments, the input data comprises security data and the output data comprises authorization data. In this way, the module may function as a secure data storage and verification module for determining whether to authorize services provided by the base unit and/or the extension module. For example, several services may be provided in parallel on the extension module, in addition to services authorized on the base unit.

In embodiments, the extension module further comprises a memory for storing the security data.

In embodiments, the security data includes one or more security keys. In embodiments, the extension module may further include one or more Trusted-Execution-Environments (TEE). Such TEEs may be deployed by, for example, the manufacturer of the module or by 3rd parties to allow trusted operation on security data from multiple stakeholders.

In embodiments, the security data further includes biometric data.

In embodiments, the security data further includes biometric authentication data stored from an external data source or generated from one or more sensors from the vehicle or the module.

In embodiments, the module and base data transceivers are wireless transceivers. As communications are established wirelessly, the datalink is not subject to the limitations of a physical electrical connection between the parts. Consequently, it is much more tolerant to mechanical displacement, and in turn locational displacement and vibrational movements. The wireless datalink is also more tolerant to the presence of contaminants and humidity. As a result, reliability of the datalink during operating conditions is much more robust and connection of the upgrade module does not necessitate specialist training.

In embodiments, the base and module wireless data transceivers communicate using one of a radio-frequency link, a wireless personal area network, a microwave link, an optical link, and a two-digit GHz data link. In this way, a high-speed, low latency, wireless datalink may be established.

In embodiments, the base unit further comprises a wireless power transmitter for transmitting power to a wireless power receiver in the extension module. In this way, no physical electrical connections are required between the module and the base unit. Consequently, the parts may be functionally coupled without requiring precise physical connection between electrical terminals.

In embodiments, the module may be provided as a mechanically sealed unit. In this way, an enclosed, self-contained, extension module may be provided, whilst, at the same time, allowing for improved integrity and reliability under operating conditions.

In embodiments, the wireless power transmitter includes a data transfer modulator for transferring data between the power receiver and the power transmitter. In this way, an additional data link can be established between the module and the base unit.

In embodiments, the module locator comprises a receptacle for securing the module in an aligned position for the power transmitter and the base wireless data transceiver when the module is received into the receptacle. In embodiments, a retainer may be provided for securing the module in the module locator. For example, a magnetic retainer or clip may be used.

In embodiments, the module locator further includes a cooling surface for absorbing heat from the module. In this way, waste heat generated by the components within the module during operation may be transferred away from the module into the module locator. This helps to maintain operation of the components and provides for heat spreading to avoid hotspots. In embodiments, the cooling surface may include a heat sink, a heat pipe, a heat spreader, or coolant conducting channels. In embodiments, the cooling surface may be formed of a heat transfer material, such as aluminum.

In embodiments, the cooling surface is located for absorbing heat from a heat dissipation region of the module when the module is located in the module locator. In this way, the cooling surface may be positioned so that it mates with the heat dissipation region of the module to ensure a high heat transfer efficiency. In embodiments, the heat dissipation region may be formed of a heat transfer material, such as aluminum.

In embodiments, the security data is used to verify driver identity and the authorization data is used to determine a vehicle control level. For example, the vehicle control level may determine whether the vehicle is permitted to drive or may be used to change an autonomous driving level. As such, the extension module may be used to set driving parameters based on a verified identity of the driver and, in combination with, the validation of the existing driving licenses.

In embodiments, the security data is used to verify driver identity and the authorization data is used to determine whether a confidential service permitted. In this way, the extensions module may be used to implement privacy compliance for confidential services, such as the presentation of confidential information on a display or confidential phone/video calls. For example, in embodiments, the processor may use security data in conjunction with other input data, such as biometric data and chassis status information to verify who is in the vehicle and that doors and windows are closed, before confidential information is presented or otherwise made available.

According to a second aspect, there is provided an extension module for use in an extendable vehicle electronics system having a base unit, a base data transceiver, and a module locator, the extension module including: a module data transceiver for communication with the base unit when the extension module is located on the module locator; and extension electronic components operable for implementing extended electronic functions in combination with base electronic components of the base unit, and wherein the extension electronic components include a processor for processing input data to generate output data within the extension module for transmission to the base unit.

In embodiments, the extension module further comprises one or more sensors for generating input data.

In embodiments, the processor is configured to generate the output data in a communication protocol for transmission to the base unit.

In embodiments, the processor is configured to process the input data to generate output data in a data format native to the base electronic components.

In embodiments, the processor is configured to process the input data to generate output data as a service output.

In embodiments, the input data includes security data and the output data comprises authorization data.

In embodiments, the security data includes encryption keys, crypto cash valets, biometric data, and private electronic documents.

In embodiments, the extension module stores third party certificates in its memory.

In embodiments, the extension module may receive base input data from the base unit. In embodiments, the base input data includes one of vehicle ID, vehicle position, vehicle speed and vehicle chassis status.

In embodiments, the extension module further includes a rechargeable energy store for powering components within the module. This may be used, for example, to power components prior to receiving power from the base unit.

According to a third aspect, there is provided a method of implementing extended electronic functions in a vehicle electronics system, the method including the steps of providing a base unit, a base data transceiver, and a module locator for locating an extension module; detecting the presence of an extension module at the module locator; establishing communications between the base data transceiver and a module data transceiver in the extension module; identifying, at the base unit, extension electronic components in the extension module operable for implementing extended electronic functions; and receiving, at the base unit, transmitted output data associated with the extended electronic functions from a processor in the extension module generated from input data within the extension module.

In embodiments, the step of identifying extension electronic components comprises identifying a sensor, and the step of receiving transmitted output data comprises receiving output data transmitted in a format for processing by the base unit.

In embodiments, the method further includes the step of installing a sensor driver based on the identified extension electronic components; and wherein the step of receiving transmitted output data includes receiving output data transmitted in a native data format specified by the sensor driver.

BRIEF DESCRIPTION OF DRAWINGS

Illustrative embodiments will now be described with reference to the accompanying drawings in which.

DETAILED DESCRIPTION

Figure 1:
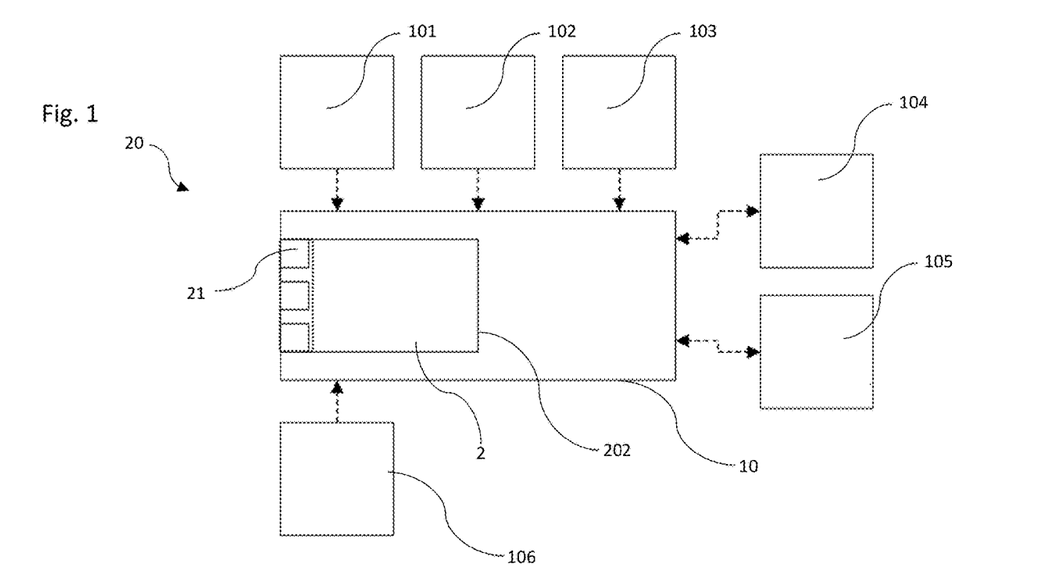
FIG. 1 is a diagram of an extendable vehicle electronics system according to a first embodiment, with the extension module inserted into the base unit.
Figure 2:
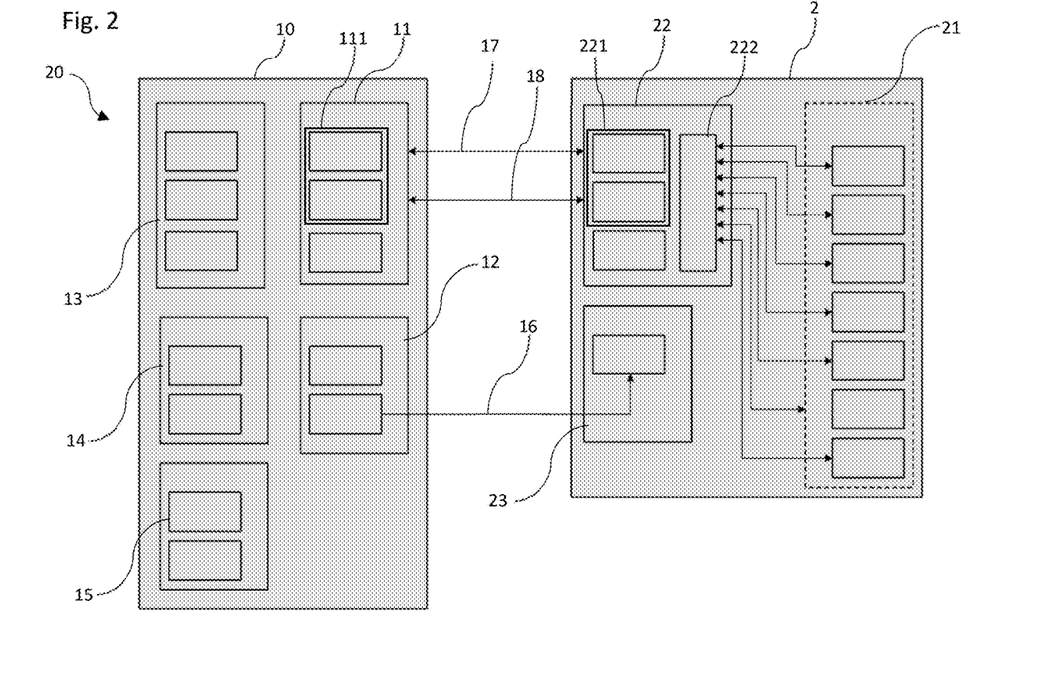
FIG. 2 is a block diagram of the components of the extendable vehicle electronics system of the first embodiment.

FIGS. 1 and 2 show diagrams of an extendable vehicle electronics system 20 according to a first embodiment, with FIG. 1 focusing on the overall system and FIG. 2 showing further detail of the internal components. In this embodiment, the vehicle electronics system 20 is an automotive Multimedia Unit (MU) for implementing infotainment, cockpit computing and other user experience (UX) functions. The vehicle electronics system 20 includes an extension module 2 and a base unit 10. As shown in FIG. 1, the base unit 10 includes a slot 202 for receiving the extension module 2.

The base unit 10 is fixed into a vehicle, for instance on the dashboard or on the rear-view mirror and is further connected to existing functional blocks 101-106 within the vehicle electronics system 20. In this embodiment, the functional blocks 101-106 include a biometric sensor 101, an environment sensor 102, and a localization data sensor 103. In addition, a vehicle status interface 104 is provided for connection to the vehicle's ethernet, control area network (CAN) and local interconnect networks (LIN). The base unit 10 is also connected to a modem 105 for communications with an external server. Further external functional blocks 106 may also be connected to the base unit 10, such as additional sensors and actuators. As shown in FIG. 2, internally, the base unit 10 includes a vehicle interface 13 for connection to the vehicle status interface 104 and functional blocks 101-106. A public network interface 15 is also provided for connection to the modem 105, and a human-machine interface 14 is connected to a display, speakers, and a microphone for two-way interaction with occupants of the vehicle for implementing UX functions.

The base unit 10 further includes a cooling plate (not shown), a base processor 11, and a data transceiver 111, and a power supply 12. The data transceiver 111 in this embodiment is a WLAN transceiver. The power supply 12 in this embodiment includes a wireless charge transmitter coil. The base processor 11 includes a plurality of electronic components for implementing base UX functions. The slot 202 within the base unit functions as a locator for the extension module 2 and may incorporate a resilient retention formation and/or mechanical clip for retaining the extension module 2 in the slot 202. This acts to retain the extension module 2 within the slot 202 and also dampen any vibrational forces applied through movement of the vehicle. The base unit's wireless charge transmitter coil, cooling plate, and WLAN transceiver are positioned relative to the slot 202 such that when the extension module 2 is inserted, these parts are aligned with their corresponding parts in the extension module 2. For example, the base unit's power supply 12 may be located adjacent to the bottom surface of the slot 202, and the WLAN transceiver may be located adjacent to the terminal end of the slot 202. When the extension module 2 is inserted, its corresponding power receiver 23 and WLAN transceiver 221 are located adjacent to these. This thereby minimizes the distance between these parts to optimize their functional coupling and maximize performance. The WLAN transceivers (e.g., data transceiver 111 and WLAN transceiver 221) are operable to provide a high-speed, low-latency datalink 17 between the components of the base unit 10 and the extension module 2. The transceivers may also provide one or more control channels 18. In embodiments, the datalink 17 may also be provided as an ASK modulated short distance radio link, with a carrier frequency in the two-digit GHz range. Although the WLAN protocol, as well as other wireless personal area network protocols, do not require precise alignment between the transceivers, the locating effect of the slot 202 allows higher speeds to be used, thereby minimizing potential interference. The wireless charging coils in the power supply 12 and power receiver 23 form a power link 16 in the form of an inductive coupling in the range of 50 to 500 kHz or resonance coupling in the frequency range of 3 to 30 MHz, primarily for transferring power from the base unit 10 to the extension module 2 for powering it during use. As such, both the extension module 2 and base unit 10 parts are equipped with coils that are operated close to resonance frequency and/or brought into a tight magnetic coupling. In other embodiments, other wireless charging technologies may be used, such as capacitive wireless charging. At the same time, the power transfer coupling may also provide bidirectional communication between the wireless charging coil in the base unit 10 and the wireless charge receiver coil in the extension module 2. For this, the charging coil arrangements each include a modulator/demodulator for modulating the power transfer signal to encode an additional, low speed, datalink. This is particularly useful for general control functionality, with the controller or processor in each of the module and base units being connected to the modulators/demodulators associated with the wireless power link coils. Finally, the cooling plate also forms a region of the upper surface of the slot 202 for improving heat transfer away from the extension module 2 during use. As such, once the extension module 2 is inserted, the cooling plate mates with the heat sink for drawing heat therefrom. Waste heat from the module is thereby concentrated to the heatsink area and is, in turn, transferred to the cooling plate for transport away to another part of the vehicle. In embodiments, the cooling plate may include a fluid coolant transfer circuit to enhance cooling efficiency.

The extension module 2 is provided as a hermetically sealed cartridge which is inserted into the slot 202 provided in the base unit 10. The extension module 2 houses a plurality of electronic components for implementing extended UX functionality through the base unit 10. The extension module 2 also includes a heat sink, a WLAN transceiver 221 and the power receiver 23, which includes the wireless charge receiver coil. As mentioned above, in this embodiment, the wireless charge receiver coil is located in the interior of the module casing, at the bottom of the module. The WLAN transceiver 221 is located at an insertion end of the extension module 2. The heat sink is thermally connected to the components within the interior of the extension module 2, and provides a thermal pathway from those components to an upper region of the extension module 2 casing. In other embodiments, an internal heat spreading element may be used to distribute heat efficiently over the whole module to maximize transfer of heat away from hot components over a larger surface area.

The extension module 2 further includes an extension processor 22 and a plurality of functional blocks 21, which provide extended functionality. The functional blocks 21 connect to the extension processor 22 via an interface 222. The functional blocks 21 may include additional sensors and, in this embodiment, include a biometric sensor, an environment sensor, and an air quality sensor. However, it will be understood that various sensors or combinations of sensors may be incorporated into the extension module.

In this connection, the biometric sensor in this embodiment is a fingerprint sensor provided on an exposed surface of the extension module housing. The fingerprint sensor may be used to read a vehicle occupant's fingerprint for identifying the individual and validating their authorization to perform certain functions, such as drive the vehicle or access personalized multimedia content. In other embodiments, other biometric sensors may be provided, such as a camera for facial recognition, or a microphone for voice recognition.

The environment sensor may be a cabin camera or other sensor used to monitor the internal environment. For example, in this embodiment, the environment sensor is a new cabin camera for vehicle occupant monitoring. This may allow an upgraded camera, with better performance to be incorporated. For example, a camera with an integrated RGB-IR sensor. Other environment sensors, such as LIDAR sensors or Time of Flight cameras could also be used to obtain improved cabin information.

The air quality sensor may be used to determine cabin air quality by detecting known contaminant substances such as smoke, CO, $CO_2$, and aerosols. In other embodiments, an alcohol sensor may be incorporated for determining if the driver is fit to operate the vehicle in a safe manner.

In other embodiments, a passenger radar sensor may be incorporated for, for instance, performing seat occupation determination, driver monitoring and health status checking. An RFID sensor may also be included for, for instance, passenger authentication purposes. Advantageously, such an RFID sensor may make use of the prominent position of the upgraded extension module 2 to provide close proximity authentication operations, whilst also being less prone to manipulation and fishing.

A microphone array may also be incorporated. For example, this may allow beam forming to be implemented in order to distinguish between different vehicle occupants and remove background noise from speech allowing for, for example, better handsfree calls and voice services.

An ultra-wide band (UWB) sensor may be incorporated, for instance as a transceiver and/or with a multi-antenna and multidirectional antenna. This may allow for precise localization of communication counterparts inside and/or outside the vehicle cabin. For example, such a UWB sensor may be used for functions such as enhanced keyless entry, where key-fob distance metering or position determinism is used.

As well as additional sensors, the extension module may also incorporate other types of functional blocks 21 such as technology upgrades. For example, extended wireless functionality may be incorporated such as enhanced Bluetooth, enhanced WLAN, and Mobile Network upgrades for providing the latest performance and feature sets. For instance, an upgraded cellular modem may be included for providing, for instance, 5G or higher access. This may allow for increased bandwidth and coverage, as well as reduced latency.

In use, the extension module 2 is located in the slot 202. During the boot sequence of the base unit 10, a low to medium energy is applied via the wireless charge transmitter coil, which transfers power to the extension module 2 for booting the components therein. This then triggers an initializing communication process in which control data is transmitted via the control channel 18 between the module and base for allowing the base unit to recognize the presence of the extension module 2 and communicatively pair the parts. For this, diagnosis data is exchanged between the parts for setting communication protocols, operational parameters and power requirements. The base processing section then enables high energy charging through the power link 16 for powering the extended functionality within the extension module 2. This results in full booting of the extension processor 22 within the extension module 2, and establishes the high-speed data link 17. The operational status of the high-speed data link 17 and the extension processor 22 may be periodically updated via the control channel 18.

Once the extension module 2 is paired with the base unit 10, the extension processor 22 and the additional functional blocks 21 may be used to enable new services and enhance existing UX services to the user. As such, the extension module 2 functions as a "plug and play" module allowing new sensors, processing capabilities and communication to be provided within the existing infotainment environment. For example, data from the additional sensors, such as an upgraded camera and the like, may be combined with existing vehicle interface information in order to enhance existing services or to enable new services. The extension module 2 may also provide enhanced processing capabilities and/or additional security. The mode of operation depends on the additional functional blocks 21 used and the existing capabilities of the base unit 10. The following modes may be implemented by the extension module:

Mode 1: The additional functional blocks 21 are new sensors in the extension module 2 and are translated or converted to fit to the interface between the base unit 10 and the extension module 2. This may be used when a new sensor on the extension module 2 provides an upgrade to an existing sensor 101-103,106 for providing better quality or coverage, or an improved error recovery or security encryption. In this scenario, the extension processor 22 may use the received sensor data input from the new sensor to generate output data for transmission to the base unit 10. As such, this mode is effective if the upgraded sensor communication protocol remains similar and the base unit can reuse certain existing drivers to facilitate data transfer.

Mode 2: The extension module 2 may perform complex pre-processing of the raw sensor data prior to transmission to the base unit 10. For example, additional functional blocks 21 are new sensors that may have a much higher bandwidth or resolution. In such scenarios, the extension processor 22 may pre-process the sensor data to comply with the native data format and communication protocols supported by the base unit 10. In embodiments, the extension processor 22 may also reduce the content of sensor data, for example by focusing a video stream on moving or fixed objects in the camera's field of view. With this mode, the output data received from the extension module 2 may appear as base sensor data to the base unit 10, albeit provided at the new, higher, specifications. Equally, the extension processor 22 may be used to apply advanced, processing-intensive methods to the sensor data that may not have been developed when the vehicle was initially produced. These may include, for example, artificial intelligence or neural network processing techniques.

Mode 3: In this mode, a high-level service application may be provided within the extension module 2, wherein the extension processor 22 performs processing on the input sensor data and delivers service information to the base unit 10. For example, the extension module 2 may facilitate cloud processing through an internal internet modem. Such high-level service applications may also utilize input data from a number of other sources. For example, the extension module 2 may scan the faces of vehicle occupants using a camera sensor, and scan their health or vaccination status, for instance using a vaccination certificate QR-code or read out from their smartphones. The extension processor 22 could then use a cloud-based service to determine if all cabin passengers are suitably health verified. The extension processor 22 may then transmit a notification to the base unit 10 that the passenger status is authorized for travel. This may in turn be used by the base unit 10 to enable the vehicle to drive.

Mode 4: Security data, such as cryptographic keys may be stored in a secure memory within the extension module 2. This may thereby allow the extension module 2 to function as personal data extension module by providing, for instance, access/authorization determinism for personal data, premium services, and secure payment information. In embodiments, sensor data from a biometric sensor may be analyzed by the extension processor 22 to determine whether to grant access to services through the base unit 10, for instance by enabling access to sorted cryptographic security keys.

During the pairing process, the extension module 2 may communicate to the base unit 10 what sensors and other functional blocks, such as processing/service capabilities, are available. The base unit 10 may then determine whether to activate that extended functionality and the appropriate operating mode. For instance, the sensor/extended services may be: (a) directly mounted using the extension processor 22 to pre-process the sensor data for transmission, (b) mounted using the extension processor 22 to heavily pre-process the sensor data for emulating existing native formats, or (c) activated as a full service controlled by the extension processor 22. When the extension module 2 is detached or powered off, the base unit 10 may fall back to the original base functions and services.

Figure 3:
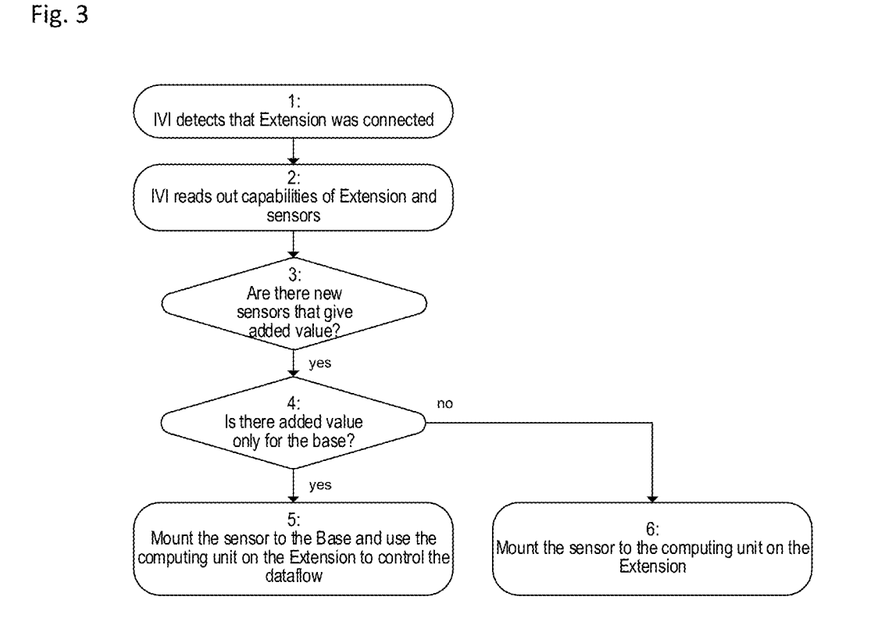
FIG. 3 is a flow diagram illustrating a method of implementing extended electronic functions in a vehicle electronics system according to an embodiment.

FIG. 3 shows a flow diagram illustrating a method of implementing extended electronic functions in a vehicle electronics system according to an embodiment. In this embodiment, the base unit is provided as an in-vehicle infotainment system (IVI). In step 1, the IVI system detects the connection of an extension module 2, for instance by insertion into a slot 202. In step 2, the IVI system reads the capabilities of the extension module 2 and any sensor or other functional blocks provided in the extension module 2. In step 3, the IVI determines if the sensor provides added value to the existing infrastructure and in step 4, whether this added value is only for the base unit 10. If yes, in step 5, the sensor is operatively mounted to the base unit 10 to mimic the function as an integral sensor of that unit, for example according to mode 1 or 2 above. As such, the extension processor 22 of the extension module 2 is used to control the data flow. If no, in step 6, the sensor is operatively mounted to the extension processor 22 of the extension module 2 itself, with the extended functions being provided as services to the base unit 10, for example according to mode 3 above.

Figure 4:
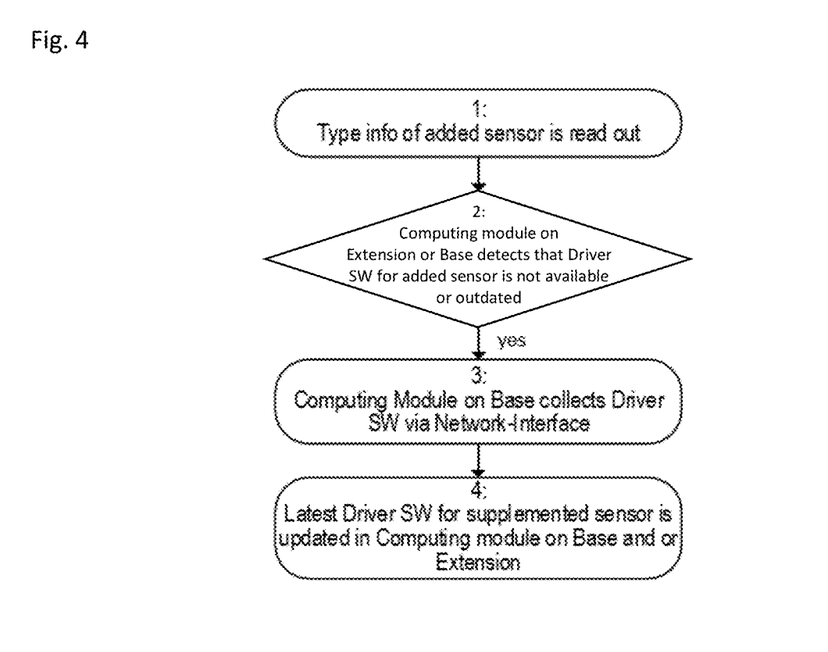
FIG. 4 is a flow diagram illustrating a method of updating driver software in a vehicle electronics system according to a second embodiment.

In some instances, the extension module 2 and/or the base unit 10 may require new driver software to facilitate operation of one or more of the additional functional blocks 21 (e.g., new sensors). FIG. 4 shows a flow diagram illustrating a method of updating the driver software. In step 1, information regarding the new sensors included in the extension module is read by the extension processor 22 of the extension module 2 or the base processor 11 of the base unit 10. In step 2, one of these processors then detects whether the driver software for the sensor is unavailable or out of date. If yes, in step 3, the base processor 11 on the base unit 10 is operated to collect current driver software via the network interface. Finally, in step 4, the latest driver software for the sensor is updated in at least one of the extension processor 22 and the base processor 11.

Figure 5:
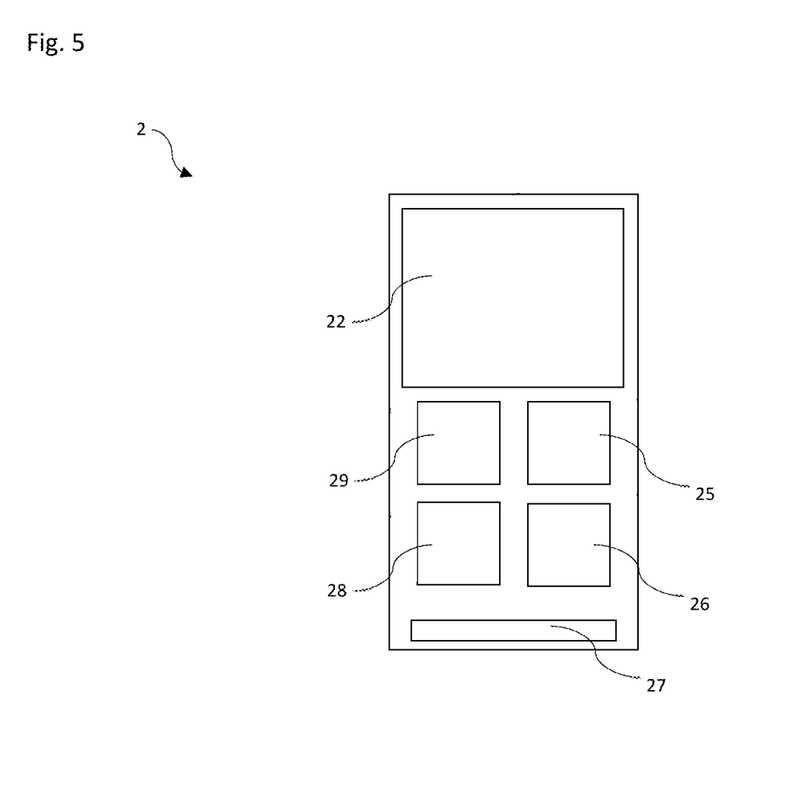
FIG. 5 is a diagram of an extension module according to a third embodiment.

FIG. 5 shows a simplified block diagram of an extension module 2 according to a further embodiment. The extension module 2 in this embodiment houses an extension processor 22, a personal data memory 25, security key memory 26, a connector 27, an energy store 28 and a control and diagnosis unit 29. The energy store 28 is used for powering components within the extension module 2 and is rechargeable using power from the base unit 10 once the extension module 2 is paired thereto. The memory 25 is used to store personal private data for a user or group of users. This data may be accessed, transferred, or otherwise manipulated by applications within the vehicle environment once the user identity has been authenticated. Security keys are also held in the security key memory 26 for enabling certain features of the vehicle infrastructure to be used. The control and diagnosis unit 29 works with the extension processor 22 to control how and when security keys and personal data are used such that the correct keys and data are released and managed for each user to external services or applications. Further, the control and diagnosis unit 29 is operable to seal and lock data in the event it identifies any tampering of software or hardware. In this embodiment, the components 24,25,26,29 of the extension module 2 therefore work together to function as a portable unit capable of securing and handling personal data.

The energy store 28 may be, for example, a capacitor or battery and may provide a buffer to allow diagnostic data communication before the power transfer is established. This may thereby allow earlier synchronization between extension module 2 and base unit 10, thereby allowing the system to be available to provide end-user functionality earlier in time after the module has been located. This may also, for instance, allow for diagnostic operations in the event that the module is located improperly or not located on the module locator at all (e.g. if left in a user's bag). In such a scenario, the extension module 2 may be detected as present in the vehicle cabin but not plugged in, and an alert may be triggered to remind the user to locate the module.

The use of the extension module 2 as a private data store and verification device may be particularly useful for storing, for example, special keys to enable features, valets for crypto cash, biometric data for identification processes, and/or private e-documents like driver license or medical files. As examples, stored personal data could be used for payment of toll-road/road-charging fees, or to grant entry permission, for instance, to a parking garage. Personal data generated while driving the vehicle, such as navigation destination, media consumed, etc., may also be securely stored on the module. Advantageously, when a user leaves the vehicle, they can take the extension module 2 with them, thereby avoiding the need to leave any personal data behind. As such, this is especially advantageous for use with shared vehicles, thereby allowing private data to be carried between vehicles or other areas, such as a user's home, shops, or a hospital. Such a system may thereby allow a driver's UX experience and/or driving data to continue seamlessly when they move to the next vehicle. For instance, if a driver has specific user defined Human-Machine Interface (HMI) settings, they may be carried from vehicle to vehicle. Moreover, the extension module may be similarly used by a group of people, such as employees of a company, to securely store and deliver data between individuals.

The handling of secure or personal data may cover several actions, such as:
 Controlled and verified storage of data and keys over secure (encrypted) data protocols.
 Separation of data for different services.
 Separation of data for different owners and data lifecycle management, including data deletion according to owner settings or data protection law restrictions.
 Protection of data inside the memory to prevent easy readout by software or hardware manipulation, e.g. by keeping stored data encrypted.
 Identifying valid service requests for authentication.
 Release of data or keys to external services over secure data protocols.
 Sealing and locking of data and communications in the event of an identified hardware or software tampering attempt.
 Linking data to a vehicle's unique Vehicle Identifier (VIN) for additional security.

Advantageously, with embodiments of the invention, the secure handling of data may be performed internally within the extension module 2, thereby enhancing the integrity of the security. The extension module 2 may, for instance, uses known service discovery and announcement methods to link automatically to available and offered services in the current infrastructure or in a cloud connection system offering services, or elsewhere in the vehicle infotainment system environment. Those services can then operate with the extension module 2 to determine if valid keys are available for enabling those services. The module may also provide services to the user that are authorized or activated by the secure data handling methods, such as authorizing the loading of media or the decoding of premium content from the cloud, and forwarding it securely to displays and speakers connected to the base unit.

The module may also store additional third-party certificates and Trusted Execution Environment (TEE) needed to enable services. For instance, an agency may trust an extension module for enabling certain features like entering or starting a shared/rental car, or allowing access to paid premium media or banking services. In one use case, the module may be used to check a driver has a valid license to control the vehicle or to change an autonomous driving level. The module may also be used to guarantee that an already authenticated user is still present by implementing ongoing monitoring, including using cabin sensors and occupant position data.

In embodiments, the module may also use one or more additional inputs or combinations thereof to validate whether secure access to stored data or keys should be granted. The inputs and valid combinations thereof may be configured for different services separately, and different combinations may be used to grant access to a particular service, provided a sufficient security threshold is reached. This thereby provides for a highly secure access, whilst enabling greater flexibility for a user. The module may gather the required inputs via its communication interfaces or its own hardware sensors, such as a fingerprint reader on the module itself. For example, the extension module 2 may access data form the vehicle's existing infrastructure, such as the vehicle ID (VIN), vehicle position (e.g. via a GNSS system, speed and other motion data, chassis status information (e.g. door/window status information), vehicle microphones and keyboards, vehicle cabin and driver cameras, and radar cabin data, and the like. For example, the identity of a user may be validated for instance, by:
 Asking for a user PIN or a verbal passphrase.
 Analyzing the voice(es) received via microphones and comparing the recorded sound with stored biometric data.
 Performing face recognition via camera feeds using internally stored biometric data.
 Performing fingerprint recognition using internally stored biometric data.
 Identifying the presence of an RFID tag.

The extension module may also implement compliance requirements for privacy by, for instance, checking who is in the vehicle and that doors and windows are closed, before a confidential service is provided, such as the display or presentation of confidential information or before a confidential phone/video calls is permitted. Equally, location data may be used to implement geo-fencing based on a user's profile.

In embodiments, the module may also use low-power RF communication to act as a key to enter a vehicle or area. It may also contain an internal app-store that is made available to the base unit computing environment once authentication has been performed by the module. This then may allow any apps or certain selected applications to be used within the paired base unit infrastructure. For example, apps that are proven not to be distracting to a driver may be selectively made available.

Finally, the module may carry a neural network configuration or a neural network processing (acceleration) unit or a combination of both. This may then be provided to the base unit's computing system after the authentication has been performed for allowing the base unit to use that AI neural service or pattern recognition as an additional service. The AI/neural network access may be closed at any other time within the extension module.

It will be understood that the embodiments illustrated above show applications only for the purposes of illustration. In practice, embodiments may be applied to many different configurations, the detailed embodiments being straightforward for those skilled in the art to implement.

For example, it will be understood that, although in the above illustrative embodiments, the module locator is located within the base unit, a module receiving part may be provided separately to the base unit. For example, in embodiments, the module receiving part may house a module locator, a wireless power coil, a WLAN transceiver, and a cooling plate. The base processing section may then be connected to this module receiving part via a cable. This may allow for greater flexibility in positioning, mounting, and cooling the extension module. As such, for instance, additional upgraded sensors incorporated into extension modules may be located at different positions within the vehicle, such as on the dashboard, the center console or the roof module, by providing a module receiving part in these locations.

It will also be understood that, although in the above examples the extension module has been described primarily in the context of an upgrade, the combination of an extension module and base unit system may also be provided in a new vehicle. That is, the vehicle's in-vehicle infotainment system may be provided from new in two parts, with the base unit and the extension module being separate and potentially also operating using different operational software. For example, different extension modules could be used to provide specific sensors and/or functionality for different vehicle variants or vehicles in different countries.

Furthermore, it will also be understood that, although in the above illustrative embodiments the power link is provided as a wireless power link, the power link may alternatively use electrical contacts. For example, terminals on the base unit may engage with two isolated contact surfaces provided on the module, thereby allowing the module to be hermetically sealed, whilst also providing relatively good location tolerance.

It will also be understood that communications between the extension module and the base unit may be based on common computer protocols (e.g. SensorAPI, ServiceAPI, PowerAPI, etc.). As such, extension modules and base units may be compatible between multiple different vendors.

Furthermore, although in the above examples, the processor has been described as a single unit, it will also be understood that the processor may include a number of separate processing components, for example for performing different processing stages. In embodiments, for instance, the processor may include a format conversion part and a pre-processing part. Similarly, other components, such as storage memory may be provided across a plurality of components.

Finally, it will also be understood that the arrangement may be applied to other applications, such as in a home or office computing or entertainment environment. For example, an extension module may be used for secure authentication, or health diagnostics, or for example to provide a new user interface for 3D interactions.

What is claimed is:

1. An extendable vehicle electronics system in a vehicle comprising:
    a base unit comprising a plurality of first electronic components configured to implement base electronic functions;
    an extension module comprising a module data transceiver and second electronic components, the second electronic components configured to operate in combination with the first electronic components to implement extended electronic functions, the second electronic components comprising a processor configured to process input data to generate output data within the extension module for transmission to the base unit;
    a base data transceiver configured to communicate between the base unit and the module data transceiver; and
    a module locator configured to locate the extension module for communication between the base unit and the module data transceiver;
    wherein the extension module further comprises one or more sensor hardware components configured to generate sensor data as the input data.

2. The extendable vehicle electronics system of claim 1, wherein the one or more sensors comprise one or more of a camera, a time of flight (TOF) camera, an accelerometer, an alcohol sensor, an air condition sensor, a gas sensor, a temperature sensor, a passenger radar sensor, a fingerprint sensor, a cellular modem, a wireless modem, a microphone array, an RFID sensor, a WLAN or Bluetooth device, a proximity locator, or a ultra-wideband device with localization sensor capabilities.

3. The extendable vehicle electronics system of claim 1, wherein the processor is further configured to generate the output data in a format for processing by the base unit.

4. The extendable vehicle electronics system of claim 1, wherein the processor is further configured to process the input data to generate output data in a data format native to the first electronic components.

5. The extendable vehicle electronics system of claim 1, wherein the processor is further configured to process the input data to generate output data as a service output.

6. The extendable vehicle electronics system of claim 1, wherein the input data comprises security data and the output data comprises authorization data.

7. The extendable vehicle electronics system of claim 6, wherein the security data includes one or more security keys or Trusted Execution Environments (TEEs).

8. The extendable vehicle electronics system of claim 6, wherein:
    the security data includes biometric authentication data stored from an external data source or generated from one or more sensors from the vehicle or the extension module; and the security data is used to verify driver identity and the authorization data is used to determine at least one of a vehicle control level and whether a confidential service is permitted.

9. An extension module for use in an extendable vehicle electronics system that comprises a base unit, a base data transceiver, and a module locator, the extension module comprising:
a module data transceiver configured to communicate with the base unit when the extension module is located on the module locator;
second electronic components configured to implement extended electronic functions in combination with first electronic components of the base unit, the second electronic components comprising a processor configured to process input data to generate output data within the extension module for transmission to the base unit; and
one or more sensor hardware components configured to generate sensor data as the input data.

10. The extension module of claim 9, wherein the one or more sensors comprise one or more of a camera, a time of flight (TOF) camera, an accelerometer, an alcohol sensor, an air condition sensor, a gas sensor, a temperature sensor, a passenger radar sensor, a fingerprint sensor, a cellular modem, a wireless modem, a microphone array, an RFID sensor, a WLAN or Bluetooth device, a proximity locator, or a ultra-wideband device with localization sensor capabilities.

11. The extension module of claim 9, wherein the processor is further configured to generate the output data in a format for processing by the base unit.

12. The extension module of claim 9, wherein the processor is further configured to process the input data to generate output data in a data format native to the first electronic components.

13. The extension module of claim 9, wherein the processor is further configured to process the input data to generate output data as a service output.

14. The extension module of claim 9, wherein the input data comprises security data and the output data comprises authorization data.

15. The extension module of claim 14, wherein the security data includes one or more security keys or Trusted Execution Environments (TEEs).

16. A method of implementing extended electronic functions in a vehicle electronics system, the method comprising:
providing a base unit, a base data transceiver, and a module locator configured to locate an extension module;
detecting a presence of an extension module at the module locator;
establishing communications between the base data transceiver and a module data transceiver in the extension module;
identifying, at the base unit, electronic components in the extension module operable for implementing extended electronic functions; and
receiving, at the base unit, transmitted output data associated with the extended electronic function from a processor in the extension module generated from input data within the extension module;
wherein the extension module further comprises one or more sensor hardware components for generating sensor data as the input data.

17. The method of claim 16, wherein:
identifying electronic components comprises identifying a sensor; and
receiving transmitted output data comprises receiving output data transmitted in a format for processing by the base unit.

18. The method of claim 17, wherein:
the method further comprising installing a sensor driver based on the electronic components; and
receiving transmitted output data comprises receiving output data transmitted in a native data format specified by the sensor driver.

* * * * *